United States Patent
Lee et al.

(10) Patent No.: US 9,004,765 B1
(45) Date of Patent: Apr. 14, 2015

(54) AIR FOIL BEARING HAVING PRESSURE DAM

(71) Applicant: Korea Institute of Science and Technology, Seoul (KR)

(72) Inventors: Yong Bok Lee, Seoul (KR); Se Na Jeong, Seoul (KR); Bokseong Choe, Gunpo-si (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 14/146,745

(22) Filed: Jan. 3, 2014

(30) Foreign Application Priority Data

Nov. 19, 2013 (KR) .......................... 10-2013-0140389

(51) Int. Cl.
*F16C 32/06* (2006.01)
*F16C 17/02* (2006.01)

(52) U.S. Cl.
CPC .................................... *F16C 17/024* (2013.01)

(58) Field of Classification Search
CPC .... F16C 17/024; F16C 17/026; F16C 17/028; F16C 32/0603; F16C 32/0607

USPC ................................... 384/103, 104, 106, 283
See application file for complete search history.

(56) References Cited

U.S. PATENT DOCUMENTS 6,158,893 A    12/2000    Heshmat

FOREIGN PATENT DOCUMENTS

| JP | 2005-265010 | | 9/2005 |
|---|---|---|---|
| JP | 2012241775 A | * | 12/2012 |
| KR | 10-2006-0034054 | | 4/2006 |
| KR | 10-0803378 | | 2/2008 |
| KR | 10-0938919 | | 1/2010 |
| KR | 10-2013-0019218 A | | 2/2013 |

* cited by examiner

*Primary Examiner* — Phillip A Johnson
(74) *Attorney, Agent, or Firm* — NSIP Law

(57) ABSTRACT

An air foil bearing has a bearing housing having a shaft hole in which a rotary shaft is inserted and a top foil fixed to the shaft hole to support the circumference of the rotary shaft, an air flow path is formed at the top foil by means of a plurality of dams protruding on the inner surface of the top foil, and the air flow path is formed so that air between the top foil and the rotary shaft flows along the circumference of the inner surface of the top foil.

8 Claims, 4 Drawing Sheets

AIR FOIL BEARING HAVING PRESSURE DAM

CROSS-REFERENCE TO RELATED APPLICATION

This application claims priority to Korean Patent Application No. 10-2013-0140389, filed on Nov. 19, 2013, and all the benefits accruing therefrom under 35 U.S.C. §119, the contents of which in its entirety are herein incorporated by reference.

BACKGROUND

1. Field

The present disclosure relates to an air foil bearing for supporting a rotating body in a rapid rotating machine, and more particularly, to an air foil bearing having a pressure dam which may concentrate and stabilize an air layer between a rotary shaft and a foil.

2. Description of the Related Art

Due to the increase of a rotation speed in various machines, a bearing supporting the rotating body is demanded to have stability and abrasion resistance at a high speed.

An air foil bearing is one of bearings developed to a rotating body with an ultrahigh speed in various machines.

The foil having a film shape supports a load of a rotary shaft, which rotates at a high speed, by using a hydrodynamic characteristic of air serving as a lubricating medium. The high-speed rotating body may be an auxiliary power device or an air conditioning system for an airplane. The air foil bearing has a configuration similar to a general air bearing, but a thin foil is inserted between the rotary shaft and the bearing housing to give additional stiffness and damping.

FIG. 1 shows a general air foil bearing.

As shown in FIG. 1, the air foil bearing includes a plurality of foil layers around a rotary shaft 4a inserted into a bearing housing 1a having a shaft hole 5a formed therein.

According to the example depicted in FIG. 1, the foil layer includes a top foil 3a and a bump foil 2a arranged from a position close to the rotary shaft 4a. Through not shown in the figure, a seam foil may be disposed between the bump foil 2a and the bearing housing 1a.

One end of each of the foils 2a, 3a is fixed to the inner side of the bearing housing 1a by a pin, and the other end extends approximately along the shape of the inner surface of the housing 1a to form a free end. The surfaces of the foils 2a, 3a are coated to enhance the friction.

The top foil 3a supports the rotary shaft 4a and is disposed so that an air lubrication film is interposed between the top foil 3a and the rotary shaft 4a. The bump foil 2a has high rigidity and is installed to improve the load supporting ability of the rotary shaft 4a, and if a hydrodynamic pressure is generated by the rotation of the rotary shaft 4a, the bump foil 2a is deformed in the circumferential direction to support the load.

If the rotary shaft 4a rotates at a high speed, a hydrodynamic pressure is generated by an air layer formed between the top foil 3a and the rotary shaft 4a, and the rotary shaft 4a rotates while receiving a floating force on the inner surface of the top foil 3a by the generated hydrodynamic pressure.

The foils described above have a function of damping vibration generated when the rotary shaft 4a rotates inside the air foil bearing. In other words, the energy generated when the rotary shaft is vibrating is dispersed by the elasticity of each foil and the coulomb friction generated when the foils relatively move in the circumferential direction while closely adhering to each other by a hydrodynamic pressure applied at the high-speed rotation of the rotary shaft, thereby damping the vibration.

In the air foil bearing, the hydrodynamic pressure of the air layer generated between the rotary shaft 4a and the top foil 3a is an important factor which dominates a vibration damping force and a load supporting force of the bearing.

As shown in FIG. 1, when the rotary shaft 4a rotates at a high speed in the clockwise direction, the hydrodynamic pressure of the air layer formed between the rotary shaft 4a and the top foil 3a is concentrated by the rotation force of the rotary shaft 4a or the like to a hydrodynamic pressure concentration region which corresponds to a lower region of ±60° based on a vertical axis (y axis), when the bearing is observed at the front, and a hydrodynamic pressure maximum point ($P_{max}$) at which the hydrodynamic pressure is maximized is formed in the hydrodynamic pressure concentration region.

In the existing technique, since the air layer between the rotary shaft 4a and the top foil 3a is not effectively concentrated, the bearing does not endure a sufficient load at high-speed rotation and thus has deteriorated hydrodynamic safety.

SUMMARY

The present disclosure is directed to providing an air foil bearing, which may provide a flow path of an air layer formed between a rotary shaft and a top foil to improve rotation safety of the rotary shaft and minimize the discharge of a hydrodynamic pressure to enhance a load supporting force.

In one aspect, there is provided an air foil bearing, which includes: a bearing housing having a shaft hole in which a rotary shaft is inserted; and a top foil fixed to the shaft hole to support the circumference of the rotary shaft, wherein an air flow path is formed at the top foil by means of a plurality of dams protruding on the inner surface of the top foil, and wherein the air flow path is formed so that air between the top foil and the rotary shaft flows along the circumference of the inner surface of the top foil.

According to an embodiment, when the rotary shaft is rotating, a hydrodynamic pressure concentration region in which a hydrodynamic pressure generated by the air between the top foil and the rotary shaft is concentrated may be formed, and the plurality of dams may include a closing dam formed in the hydrodynamic pressure concentration region to block the flow of air flowing along the air flow path.

The hydrodynamic pressure concentration region may include a hydrodynamic pressure maximum point at which the hydrodynamic pressure is maximized, and the closing dam may be formed at the hydrodynamic pressure maximum point.

In addition, the closing dam may include a barrier wall formed in the middle of the air flow path to block the air flow path, and an induction wall extending from the barrier wall and inducing the air flowing in the air flow path to discharge out of the top foil.

In addition, the induction wall may be formed to be inclined from the side end of the top foil to the barrier wall in the same direction as a rotation direction of the rotary shaft.

In addition, the plurality of dams may include a plurality of induction dams disposed at predetermined intervals to form the air flow path, and an air inflow path for concentrating the air on the air flow path may be formed between two induction dams adjacent to each other in the circumferential direction of the top foil.

In addition, the induction dams may be formed to be inclined from the side end of the top foil to the air flow path in the same direction as a rotation direction of the rotary shaft.

In addition, two induction dams may be symmetrically formed in the width direction of the top foil, so that the air flow path is formed along the central axis in the circumferential direction of the top foil.

In addition, an air outflow path for discharging air from the air flow path to the side end of the top foil may be formed between the closing dam and an induction dam adjacent to the closing dam in the circumferential direction of the top foil, and the air outflow path may be formed by an inclined plane whose height increases in the radial direction of the top foil from the air flow path to the side end of the top foil.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Figure 1:
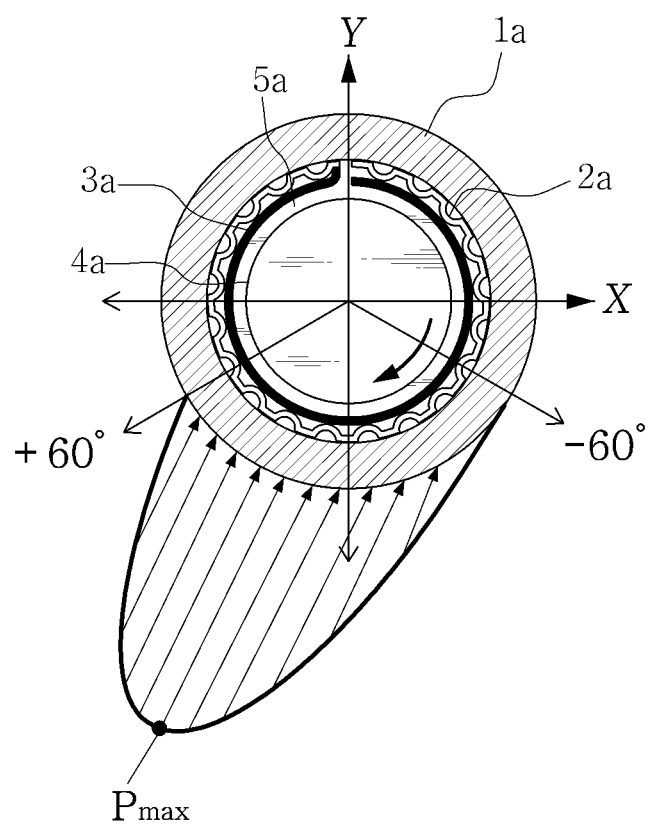
FIG. 1 shows a general air foil bearing.

Hereinafter, an embodiment of the present disclosure will be described with reference to the accompanying drawings. Even though the present disclosure is based on the embodiments depicted in the drawings, it is just for better understanding, and the spirit, essential configurations and operations of the present disclosure are not limited thereto.

Figure 2:
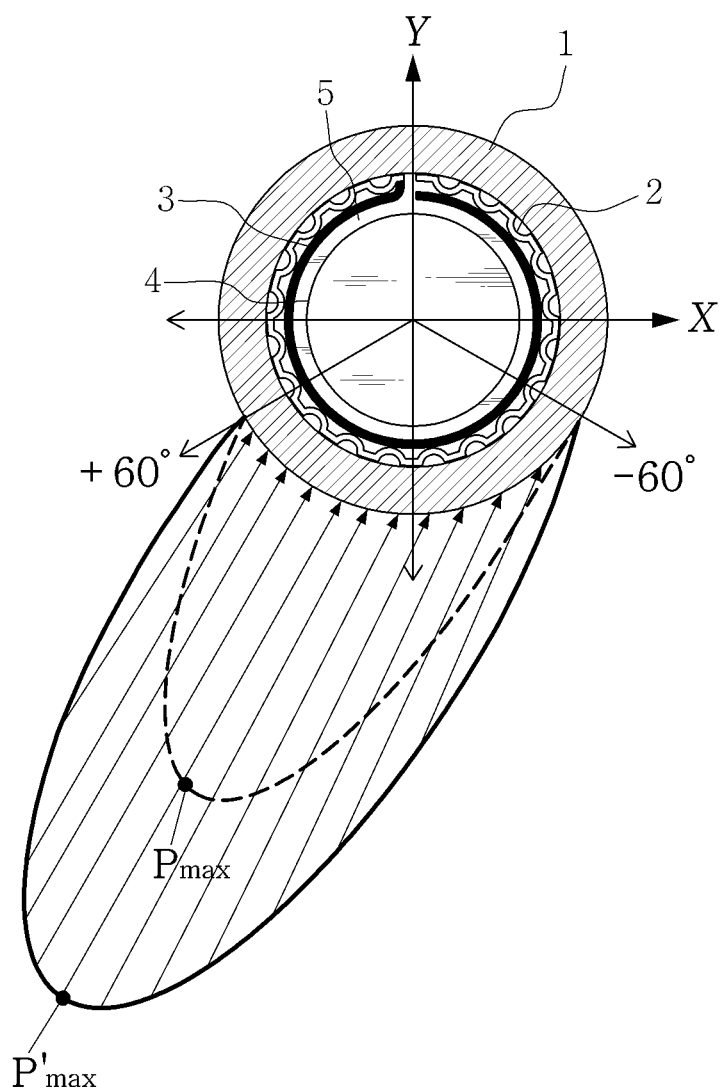
FIG. 2 shows an air foil bearing according to an embodiment of the present disclosure.

FIG. 2 shows an air foil bearing according to an embodiment of the present disclosure.

As shown in FIG. 2, the air foil bearing of this embodiment includes a bearing housing 1 having a shaft hole 5, and a plurality of foil layers fixed inside the bearing housing 1 to support a rotary shaft 4 inserted into the shaft hole 5.

The plurality of foil layers includes a top foil 3 and a bump foil 2 from a location close to the rotary shaft 4. Through not shown in the figure, a seam foil may be disposed between the bump foil 2 and the bearing housing 1.

One end of each of the foils 2, 3 is fixed to the inner side of the bearing housing 1 by a pin, and the other end extends approximately along the shape of the inner surface of the housing 1 to form a free end. The surfaces of the foils 2, 3 are coated to enhance the friction.

The top foil 3 supports the rotary shaft 4 and is disposed so that an air lubrication film is interposed between the top foil 3 and the rotary shaft 4. The bump foil 2 has high rigidity and is installed to improve the load supporting ability of the rotary shaft 4, and if a hydrodynamic pressure is generated by the rotation of the rotary shaft 4, the bump foil 2 is deformed in the circumferential direction to support the load.

If the rotary shaft 4 rotates at a high speed, a hydrodynamic pressure is generated by an air layer formed between the top foil 3 and the rotary shaft 4, and the rotary shaft 4 rotates while receiving a floating force on the inner surface of the top foil 3 by the generated hydrodynamic pressure.

The foils described above have a function of damping vibration generated when the rotary shaft 4 rotates inside the air foil bearing. In other words, the energy generated when the rotary shaft is vibrating is dispersed by the elasticity of each foil and the coulomb friction generated when the foils relatively move in the circumferential direction while closely adhering to each other by a hydrodynamic pressure applied at the high-speed rotation of the rotary shaft, thereby damping the vibration.

In this embodiment, as shown in FIG. 2, when the rotary shaft 4 rotates at a high speed in the clockwise direction, the hydrodynamic pressure of the air layer formed between the rotary shaft 4 and the top foil 3 is concentrated by the rotation force of the rotary shaft 4 or the like to a hydrodynamic pressure concentration region of ±60° based on a vertical axis (y axis), when the bearing is observed at the front, and a hydrodynamic pressure maximum point ($P_{max}'$) at which the hydrodynamic pressure is maximized is formed in the hydrodynamic pressure concentration region.

As comparatively shown in FIG. 2, the air foil bearing of this embodiment has a hydrodynamic pressure distribution characteristic similar to that of the general air foil bearing depicted in FIG. 1 but has a greatly improved hydrodynamic pressure.

This improvement of hydrodynamic pressure characteristic is performed by a plurality of pressure dams formed at the inner side of the top foil 3.

Figure 3:
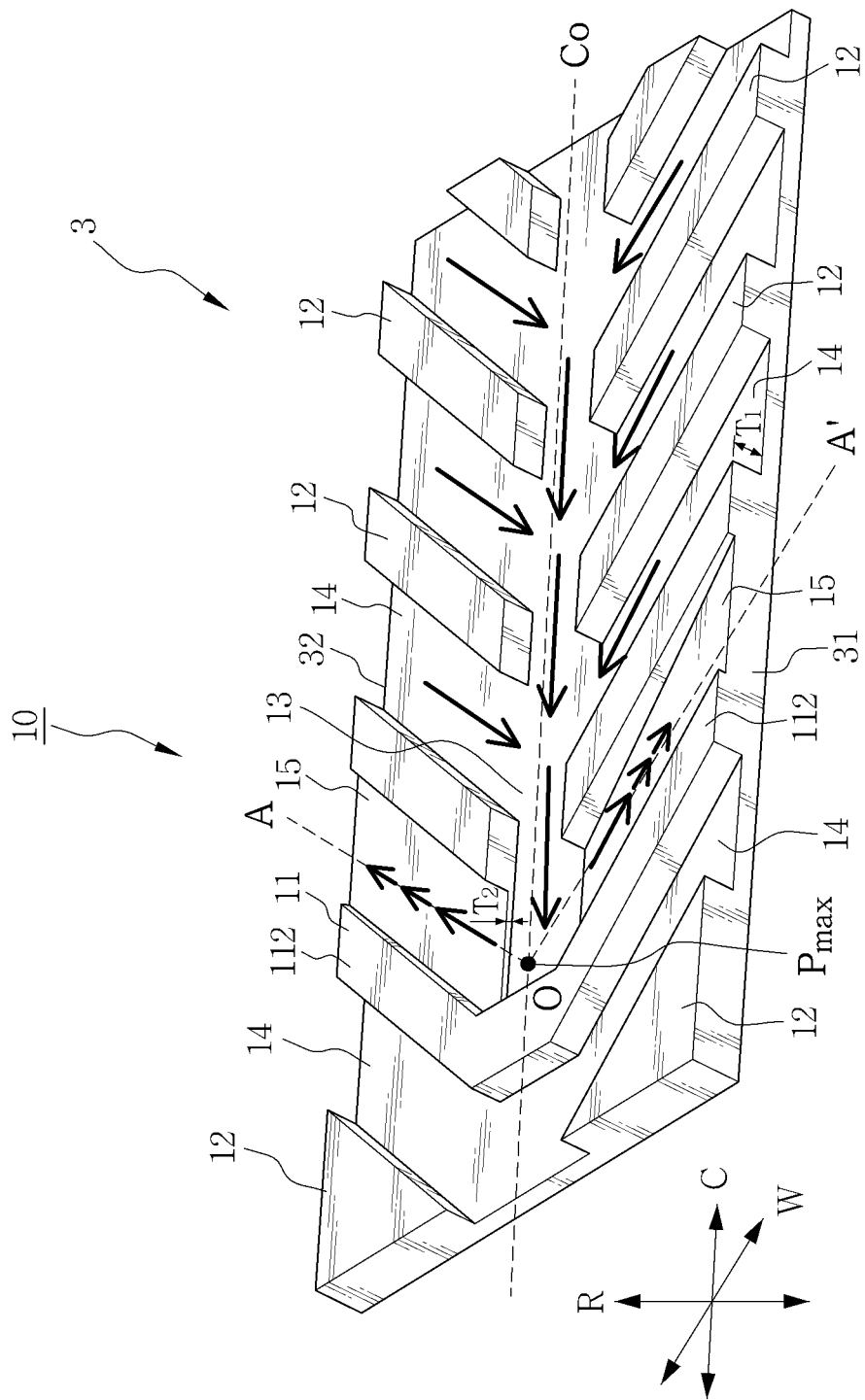
FIG. 3 shows a part of a top foil of the air foil bearing depicted in FIG. 2.
Figure 4:
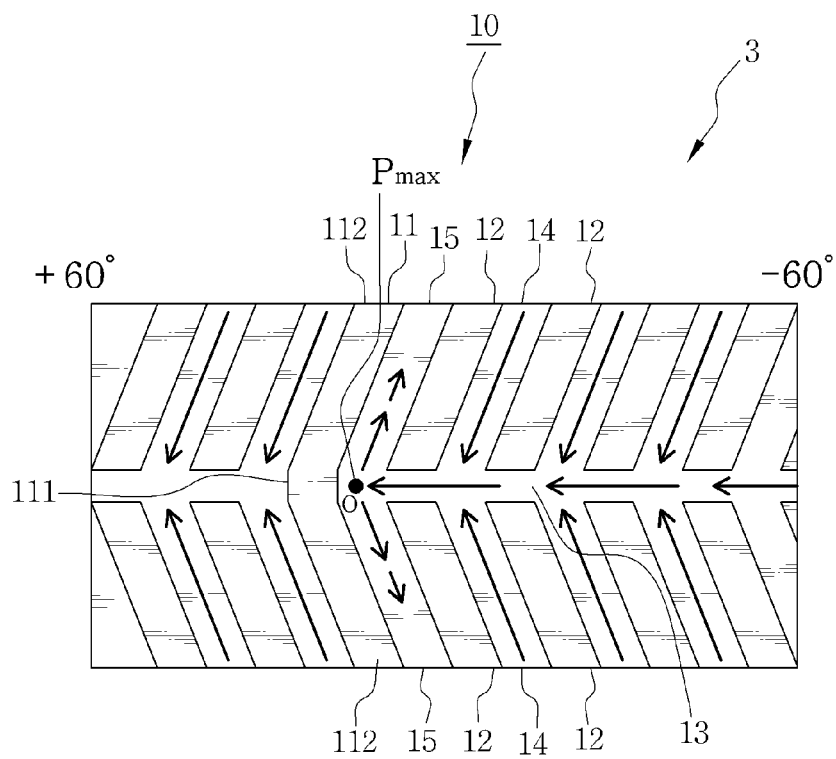
FIG. 4 shows a part of the top foil of the air foil bearing.

FIGS. 3 and 4 show a part of the top foil 3 according to an embodiment of the present disclosure. FIG. 3 is a partial perspective view of the top foil 3, and FIG. 4 is a partial plane view of the top foil 3.

As shown in FIGS. 3 and 4, an air flow path 13 is formed at the top foil 3 by a plurality of dams 10 protruding in a herringbone type on the inner side of the top foil 3.

The plurality of dams 10 includes a plurality of induction dams 12 arranged at predetermined intervals in the circumferential direction (C) of the top foil 3.

As depicted, two induction dams 12 make a pair symmetrically in the width direction (W) of the top foil 3, and two induction dams 12 symmetrically formed are spaced apart at a predetermined interval, thereby forming the air flow path 13 along the central axis (Co) in the circumferential direction (C) of the top foil 3.

Each induction dam 12 is formed to be inclined in a direction identical to the rotation direction of the rotary shaft 4 (in the left direction on the figure) from side ends 31, 32 of the top foil 3, which are both ends thereof in the width direction (W), to the air flow path 13.

In addition, an air inflow path 14 for concentrating the air to the air flow path 13 is formed between two induction dams 12 adjacent to each other in the circumferential direction (C) of the top foil 3.

In this configuration, as depicted by arrows on the figure, if the rotary shaft 4 rotates with respect to the top foil 3, an external air flows into the air inflow path 14 between the induction dams 12 formed in the herringbone type, and the inflow air is concentrated to the air flow path 13 to flow in the rotation direction of the rotary shaft 4.

Therefore, since the air between the top foil 3 and the rotary shaft 4 is concentrated near the central axis (Co) in the width direction of the top foil 3, the air layer for forming hydrodynamic pressure is not dispersed but concentrated to increase the hydrodynamic pressure of the bearing as a whole.

Meanwhile, the plurality of dams 10 includes a closing dam 11 for blocking the flow of air flowing along the air flow path 13.

The closing dam 11 includes a barrier wall 111 formed on the air flow path 13 to block the air flow path 13, and an induction wall 112 extending from the barrier wall 111 to induce the air flowing along the air flow path 13 to discharge out of the top foil 3.

As shown in FIGS. 3 and 4, the induction wall 112 is formed to be inclined in a direction identical to the rotation direction of the rotary shaft 4 from the side ends 31, 32 of the top foil 3 to the barrier wall 111, similar to the induction dam 12.

According to this embodiment, the closing dam 11 is formed in a hydrodynamic pressure concentration region of the bearing in which the hydrodynamic pressure is concentrated, in more detail at a hydrodynamic pressure maximum point ($P_{max}'$) of the hydrodynamic pressure concentration region at which the hydrodynamic pressure is maximized (see FIG. 2).

According to this embodiment, since the plurality of dams 10 is uniformly formed in the herringbone type, the hydrodynamic pressure concentration region and the hydrodynamic pressure maximum point are not changed greatly in comparison to a general air foil bearing not having a plurality of dams 10 as shown in FIG. 2.

Therefore, it is also possible to calculate a hydrodynamic pressure concentration region and a location (O) of a hydrodynamic pressure maximum point of an air foil bearing not having a dam 10 by using a known hydrodynamic pressure characteristic model of the air foil bearing or a hydrodynamic pressure calculation method, and then determine the corresponding location as a location where the closing dam 11 is to be formed.

The expression "the closing dam 11 is formed at the hydrodynamic pressure maximum point" used in the specification does not mean that the closing dam 11 must be formed exactly at the location of the hydrodynamic pressure maximum point, but means that the closing dam 11 is formed as closest to a location specified as the hydrodynamic pressure maximum point as possible.

As shown in FIGS. 3 and 4, the barrier wall 111 of the closing dam 11 may also be located at an upstream in comparison to the hydrodynamic pressure maximum point (O).

According to this configuration, the air concentrated along the air flow path 13 collides with the closing dam 11 and greatly increases the pressure of the hydrodynamic pressure maximum point (O). If the pressure of the hydrodynamic pressure maximum point (O) increases, the pressure of the hydrodynamic pressure concentration region near the hydrodynamic pressure maximum point increases as a whole, thereby improving the hydrodynamic pressure of the entire bearing.

As shown in FIGS. 3 and 4, the air colliding with the closing dam 11 discharges from the top foil 3 through the air outflow path 15. The air outflow path 15 is formed between the closing dam 11 and an induction dam 12 adjacent to the closing dam 11 in the circumferential direction (C) of the top foil 3, and the air flowing through air outflow path 15 from the air flow path 13 discharges to the side ends 31, 32 of the top foil 3.

Figure 5:
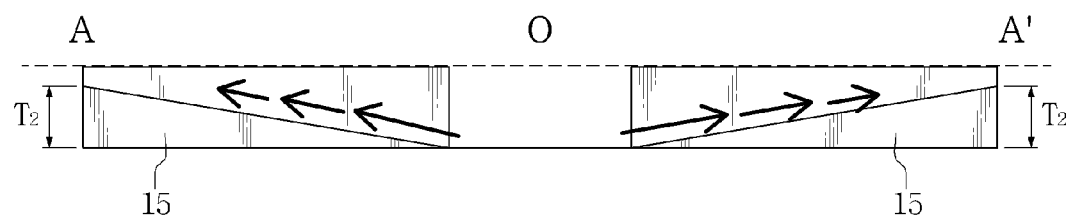
FIG. 5 is a cross-sectional view showing the top foil, taken along the line A-A' of FIG. 2.

FIG. 5 is a cross-sectional view showing the top foil 3, taken along the line A-A' of FIG. 2.

As best shown in FIGS. 3 and 5, the air outflow path 15 is formed by an inclined plane whose height increases in the radial direction (R) of the top foil 3 from the air flow path 13 to the side ends 31, 32 of the top foil 3 ($t_1 < t_2$).

Even though FIG. 3 shows that the inclined plane adjacent to the air flow path has a predetermined height ($t_1$), the inclined plane adjacent to the air flow path may not have a predetermined height (namely, $t_1=0$) as shown in FIG. 5.

The air outflow path 15 configured as above plays a role of a kind of seal which blocks the outflow of air, thereby further increasing the pressure at the hydrodynamic pressure maximum point.

According to this embodiment, since air is concentrated at the inner side of the top foil 3 and the flowing air is concentrated at the hydrodynamic pressure maximum point by the closing dam 11, the overall hydrodynamic pressure of the air foil bearing increases, thereby improving rotation safety and load supporting force of the rotary shaft 4.

What is claimed is:

1. An air foil bearing, comprising:
    a bearing housing having a shaft hole in which a rotary shaft is inserted; and
    a top foil fixed to the shaft hole to support the circumference of the rotary shaft,
    wherein an air flow path is formed at the top foil by means of a plurality of dams protruding on the inner surface of the top foil,
    wherein the air flow path is formed so that air between the top foil and the rotary shaft flows along the circumference of the inner surface of the top foil,
    wherein when the rotary shaft is rotating, a hydrodynamic pressure concentration region in which a hydrodynamic pressure generated by the air between the top foil and the rotary shaft is concentrated is formed, and
    wherein the plurality of dams includes a closing dam formed in the hydrodynamic pressure concentration region to block the flow of air flowing along the air flow path.

2. The air foil bearing according to claim 1,
    wherein the hydrodynamic pressure concentration region includes a hydrodynamic pressure maximum point at which the hydrodynamic pressure is maximized, and
    wherein the closing dam is formed at the hydrodynamic pressure maximum point.

3. The air foil bearing according to claim 1, wherein the closing dam includes:
    a barrier wall formed in the middle of the air flow path to block the air flow path, and
    an induction wall extending from the barrier wall and inducing the air flowing in the air flow path to discharge out of the top foil.

4. The air foil bearing according to claim 3,
    wherein the induction wall is formed to be inclined from the side end of the top foil to the barrier wall in the same direction as a rotation direction of the rotary shaft.

5. The air foil bearing according to claim 1,
    wherein the plurality of dams includes a plurality of induction dams disposed at predetermined intervals to form the air flow path, and
    wherein an air inflow path for concentrating the air on the air flow path is formed between two induction dams adjacent to each other in the circumferential direction of the top foil.

6. The air foil bearing according to claim 5,
    wherein the induction dams are formed to be inclined from the side end of the top foil to the air flow path in the same direction as a rotation direction of the rotary shaft.

7. The air foil bearing according to claim 6,
    wherein the two induction dams are symmetrically formed in the width direction of the top foil, so that the air flow path is formed along the central axis in the circumferential direction of the top foil.

8. The air foil bearing according to claim 5,
    wherein an air outflow path for discharging air from the air flow path to the side end of the top foil is formed between the closing dam and an induction dam adjacent to the closing dam in the circumferential direction of the top foil, and wherein the air outflow path is formed by an inclined plane whose height increases in the radial direction of the top foil from the air flow path to the side end of the top foil.

* * * * *